United States Patent [19]

Brisabois

[11] 4,363,248

[45] Dec. 14, 1982

[54] TRANSMISSION DIFFERENTIAL GEAR

[75] Inventor: Roger Brisabois, Clamart, France

[73] Assignee: Regie Nationale des Usines Renault, Boulogne Billancourt, France

[21] Appl. No.: 150,682

[22] Filed: May 16, 1980

[30] Foreign Application Priority Data

May 18, 1979 [FR] France ............................ 79 12723

[51] Int. Cl.³ ........................... F16H 1/40; F16H 1/38
[52] U.S. Cl. ......................................... 74/713; 74/710
[58] Field of Search ................ 74/710, 710.5, 711, 74/713, 423, 424

[56] References Cited

U.S. PATENT DOCUMENTS

| 2,490,146 | 12/1949 | Miller, Jr. ............................ 74/711 |
| 3,593,595 | 7/1971 | Taylor ................................. 74/713 |
| 3,874,251 | 4/1975 | Lapitsky et al. ..................... 74/713 |
| 3,955,443 | 5/1976 | Estrada ............................... 74/713 |
| 3,964,346 | 6/1976 | Myers, Sr. ........................... 74/711 |
| 4,037,492 | 7/1977 | Ashauer et al. ..................... 74/710 |

FOREIGN PATENT DOCUMENTS

| 647800 | 9/1962 | Canada ................................ 74/711 |
| 1111379 | 2/1956 | France ................................ 74/713 |
| 1161981 | 9/1958 | France ................................ 74/713 |
| 2234809 | 1/1975 | France . | |
| 2356850 | 1/1978 | France . | |
| 501859 | 11/1954 | Italy .................................... 74/711 |

Primary Examiner—Leslie A. Braun
Attorney, Agent, or Firm—Fleit & Jacobson

[57] ABSTRACT

This transmission differential gear of the type comprising a cage enclosing a pair of driven bevel sun gears and a plurality of sun gear driving planet pinions mounted for loose rotation on pins fitted in corresponding bores formed through the cage walls, comprises an annular member encircling the cage and adapted to partially close the outer ends of these bores. The differential gear is intended more particularly for road vehicles.

9 Claims, 14 Drawing Figures

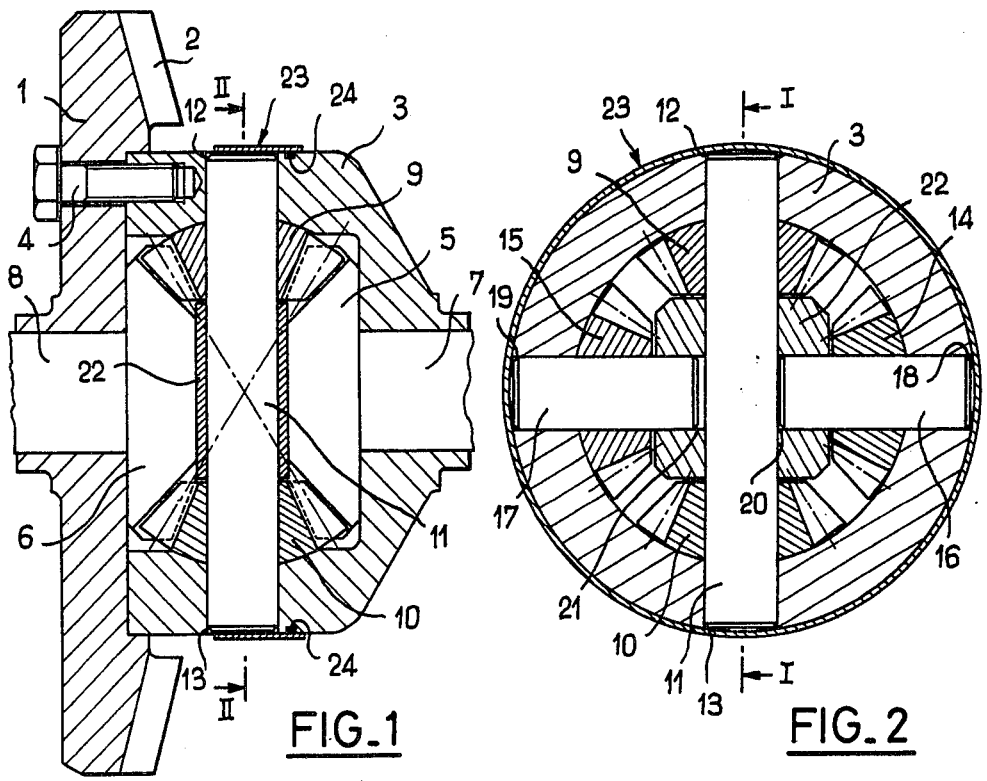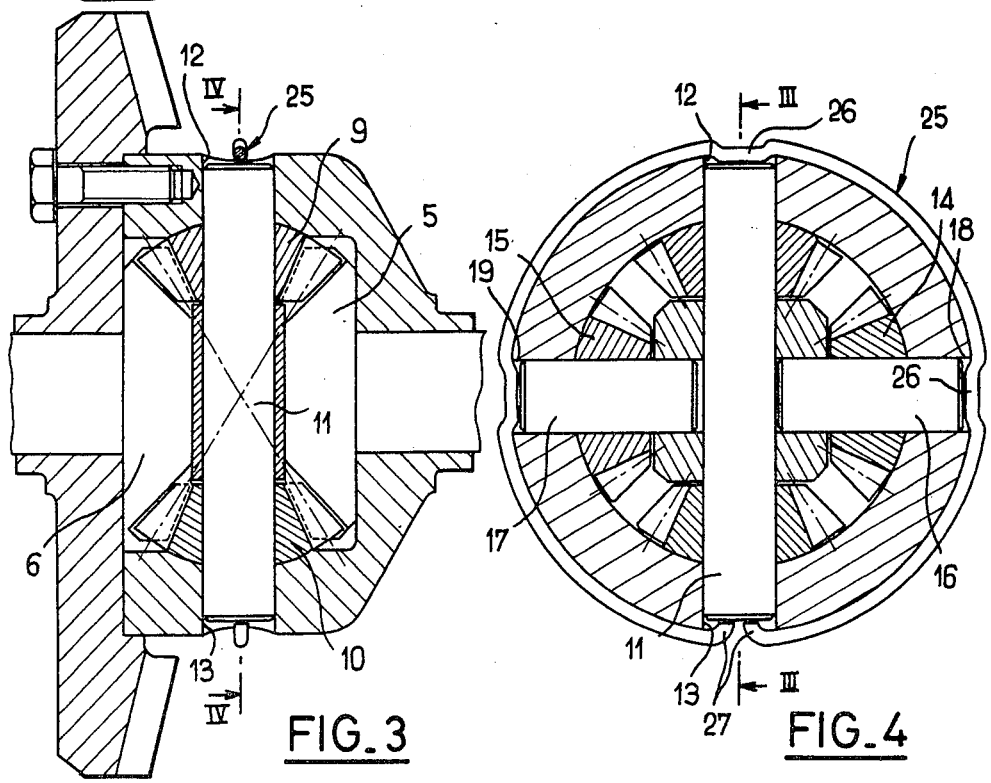

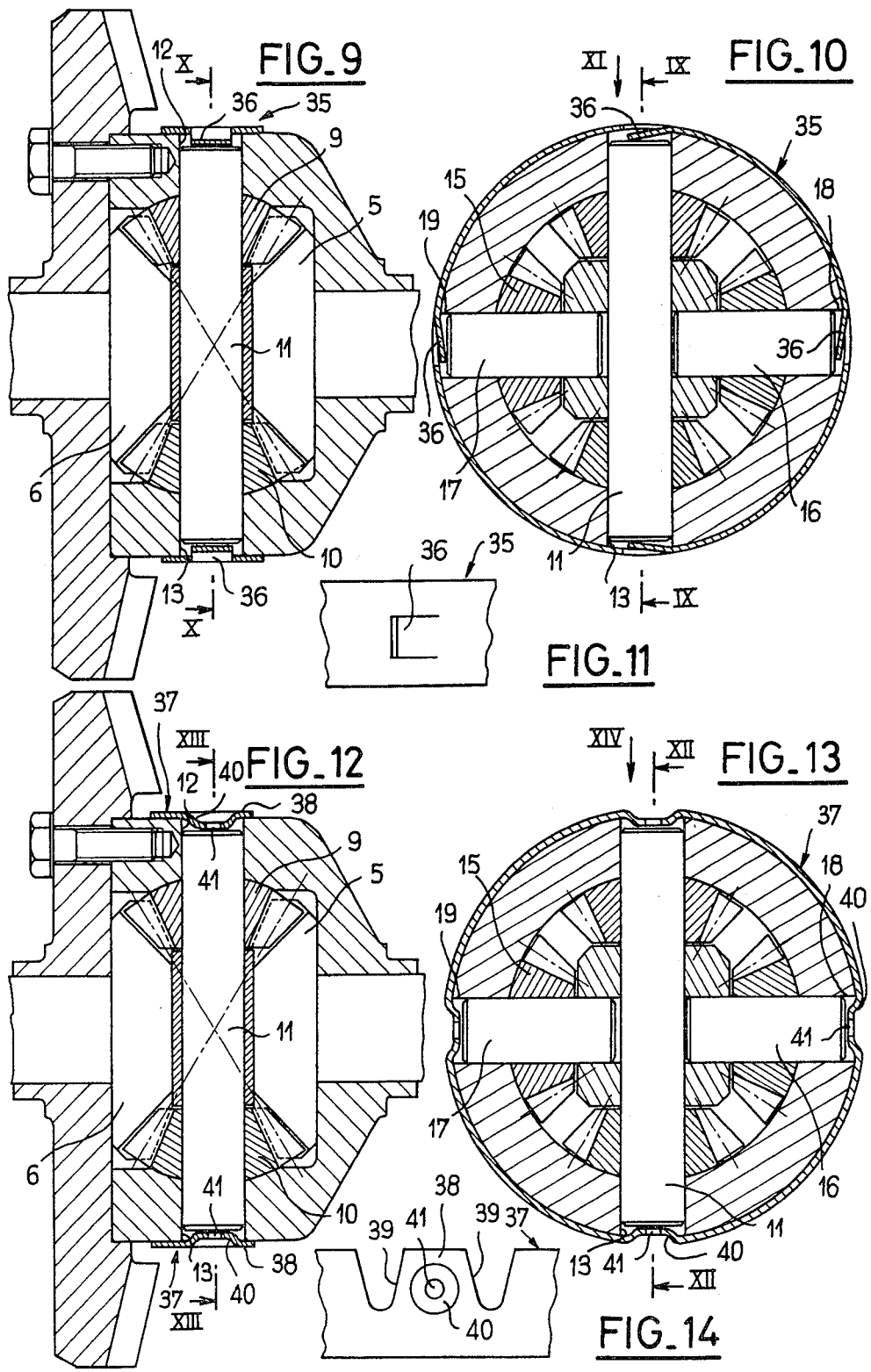

TRANSMISSION DIFFERENTIAL GEAR

BACKGROUND OF THE INVENTION

The present invention relates to transmission differential gears of the type currently used for driving the drive wheels of road vehicles, which comprises a cage or housing enclosing a pair of driven bevel sun gears or side gears and bevel planet pinions for driving said sun gears which are mounted for free rotation on at least one pin mounted in corresponding bores formed in the cage.

As a rule, the planet carrier shaft or shafts are held against rotation in the cage or housing by means of shouldered screws or spring pins.

SUMMARY OF THE INVENTION

It is the specific object of the present invention to provide an improved mounting for said planet carrier pin or pins, which is both simple in construction and capable of releasing the pin or pins for free rotation, thus reducing appreciably the possibility of jamming the planet gears on their pins while meeting the essential requirement of permitting a visual manufacturing supervision for checking the proper positioning of the component elements of the differential gear.

For this purpose, the transmission differential gear according to this invention, of the type broadly mentioned hereinabove, is characterized in that the planet carrier pin or pins is or are held in position by means of an annular member encircling the cage so as to partially close the outer end of the bores formed therein for receiving said pin or pins.

Various form of embodiment of the present invention will now be described by way of illustration, not of limitation, with reference to the attached drawings, in which the same reference numerals are used for designating similar or identical component elements throughout.

BRIEF DESCRIPTION OF THE DRAWINGS

FIG. 1 is a sectional view of a differential gear, the section being taken along the line I—I of FIG. 2;

FIG. 2 is a section taken along the line II—II of FIG. 1;

FIGS. 3 and 4 are sectional views of a differential gear cage or housing, taken along the lines III—III of FIG. 4 and IV—IV of FIG. 3, respectively;

FIGS. 9 and 10 are sectional views of a differential gear cage, taken along the lines IX—IX of FIG. 10 and X—X of FIG. 9, respectively;

FIG. 11 is a detail view of the annular member, as seen in the direction of the arrow XI of FIG. 10;

FIGS. 12 and 13 are sectional views of a differential gear cage, taken along the lines XII—XII of FIG. 13 and XIII—XIII of FIG. 12, respectively, and FIG. 14 is a detail view of said annular member, as seen in the direction of the arrow XIV of FIG. 13.

DESCRIPTION OF THE PREFERRED EMBODIMENTS

Figures 5, 6:
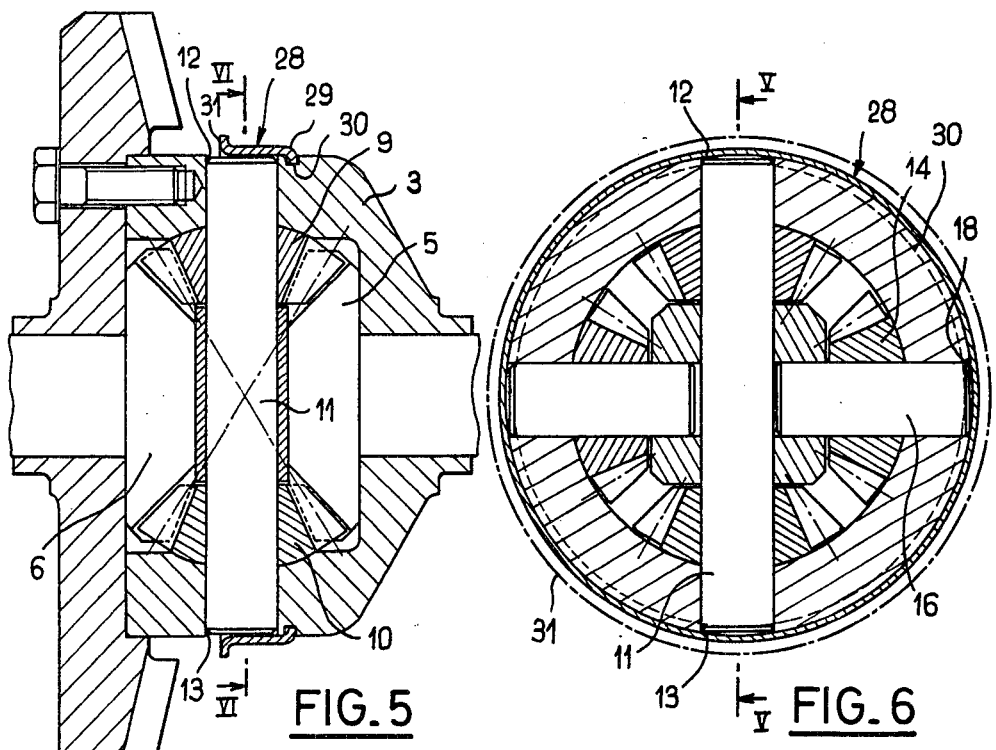
FIGS. 5 and 6 are sectional views of a differential gear cage, taken along the lines V—V of FIG. 6 and VI—VI of FIG. 5, respectively.

The differential gear housing illustrated in FIG. 1 comprises two main component elements, i.e. a flange 1 having a circular set of bevel teeth 2 formed along its outer periphery, which constitutes the driven member or crown wheel of the conventional bevel gear, and a bell-shaped member 3 acting as a cage or planet carrier, which is assembled by means of screws 4 to said flange 1.

Enclosed in cage 3 are two bevel sun gears 5, 6 connected to a pair of opposed output shafts 7 and 8, respectively. A plurality of planet pinions (four in the example illustrated) are in constant meshing engagement with sun gears 5, 6; two opposed planet pinions 9, 10 are mounted for free rotation on a pinion pin 11 mounted in turn in corresponding bores 12, 13 through the walls of cage 3, and another pair of opposed planet pinions 14, 15 are mounted on relevant aligned planet pinion pins 16, 17 respectively, disposed at right angles to said pin 11 and fitted in turn in corresponding bores 18, 19 formed through the cage walls, and also in corresponding bores 20, 21 formed in a central block 22 through which planet pinion pin 11 extends, as shown in FIG. 2.

According to a specific form of embodiment of the present invention, the planet pinion pin 11 and the pair of aligned planet pinion pins 16, 17 are held in position by means of a single metal member in the form of a ring or annulus 23 encircling the cage 3 so as to close partially the outer ends of bores 12, 13, 18 and 19; this ring 23 may if desired be simply cemented to cage 3, for example, by depositing a suitable cement in a collecting groove or cavity formed in the outer surface of the cage, as shown at 24.

Alternatively, as shown in FIGS. 3 and 4, the planet pinion pin 11 and the aligned transverse pins 16 and 17 are held in position in cage 3 by using an expansible metal circlip 25 encircling the cage 3 and formed with three inwardly projecting depressions 26 corresponding substantially in shape to the outlets of bores 12, 18 and 19 and also with inwardly bent registering end portions 27 projecting likewise into the corresponding end portions of bore 13.

FIGS. 5 and 6 of the drawings illustrate another form of embodiment of the ring member for holding the pin 11 and aligned pins 16, 17 in the form of a metal ring 28 formed with an in-turned edge 29 adapted snappily to engage a groove 30 formed in cage 3, and an opposite external projecting edge 31 for facilitating its engagement on the outer periphery of said bell-shaped cage 3.

Figures 7, 8:
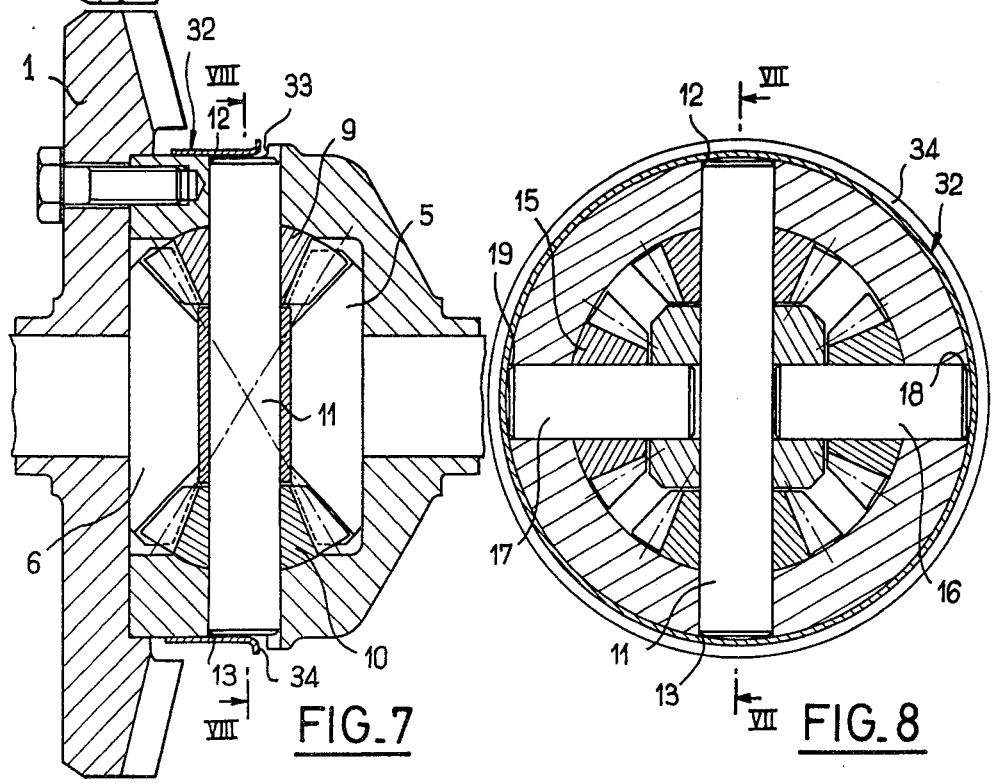
FIGS. 7 and 8 are sectional views of a differential gear cage, taken along the lines VII—VII of FIG. 8 and VIII—VIII of FIG. 7, respectively.

FIGS. 7 and 8 illustrate a different form of embodiment of the invention comprising a metal ring 32 fitted on the outer periphery of cage 3 before assembling same with the flange 1. This ring 32 is held in the axial direction by a pair of stops consisting the one of flange 1 and the other of an annular shoulder or projection 33, which are so formed on cage 3 that they intersect the outlets of bores 12, 13, 18, 19 and uncover one portion of the end faces of pins 11, 16 and 17. This ring 32 is also formed with an external projecting edge 34 to facilitate its engagement on bell-shaped cage 3 during the differential gear assembling operation.

FIGS. 9 and 11 illustrate another method of holding the pin 11 and aligned pins 16, 17 by means of a metal ring 35 formed with precut lugs 36 adapted to register with the outlets or end portions of 12, 13 and 18, 19. In the assembled condition, as shown in these Figures, these lugs 36 are bent inwardly and one portion of the ends of pin 11, 16 and 17 is thus still visible from the outside in the differential gear assembled condition.

FIGS. 12, 13 and 14 illustrate a further modified method of holding the pins 11, 16 and 17 by means of a metal ring 37 formed with precut lugs 38 corresponding to the outlets of bores 12, 13 and 18, 19 and obtained by forming lateral axial notches 39; said lugs 38 are provided with inwardly pressed bosses 40 shaped and dimensioned for proper engagement into the outer ends of bores 12, 13, 18 and 19 when the ring has been force fitted over the cage 3 by resiliently deflecting said lugs 38; in this example, the pressed bosses 40 are formed with a central hole 41 so that the outer ends of pins 11, 16 and 17 are visible therethrough.

Of course, other modifications and changes may be brought to the specific forms of embodiment shown and described herein without departing from the basic principles of the invention set forth in the appended claims, as will readily occur to those conversant with the art.

What is claimed as new is:

1. A transmission differential gear comprising a cage enclosing a pair of driven bevel sun gears and a plurality of bevel planet pinions for driving said sun gears, said planet pinions being rotatably mounted on at least one pin fitted through corresponding bores formed through the walls of said cage, wherein said pin is held in position by means of an annular member encircling said cage and closing partially the outer ends of said bores to permit visual inspection of said pin, said annular member retaining said at least one pin in said bores and permitting free rotation of said at least one pin.

2. A differential gear as claimed in claim 1, wherein said annular member is a metal ring cemented to said cage.

3. A differential gear as claimed in claim 1, wherein said annular member consists of an expansible metal circlip shaped for positioning engagement with the outer ends of said bores.

4. A differential gear as claimed in claim 1, wherein said annular member consists of a metal ring formed with a in-turned edge portion adapted snappily to engage a corresponding cavity formed in the outer wall of said cage and with a projecting opposite external edge portion for facilitating its engagement on the cage.

5. A differential gear as claimed in claim 1, wherein said annular member is a metal ring adapted to be fitted in the gap formed between a pair of registering shoulders consisting of two component elements of the differential housing before the assembling thereof, one shoulder intersecting one of said bore ends.

6. A differential gear as claimed in claim 1, wherein said annular member consists of a metal ring formed with precut lugs adapted to register with said bore ends and to be bent permanently inwards when said ring is fitted in position.

7. A differential gear as claimed in claim 1, wherein said annular member consists of a metal ring formed with precut lugs registering with said bore ends, said lugs being obtained by cutting notches on either side thereof and having each an inwardly pressed boss formed therein for proper engagement with said bore ends.

8. A differential gear as claimed in claim 1 or 4, wherein said at least one pin extends between two bores formed in walls of said cage and carries two planet pinions, and wherein said gear further comprises a central block positioned in said cage and having a first bore formed therein for passage of said at least one pin, a pair of pinion pins extending at right angles to said at least one pin, bores formed in said central block and said cage walls for supporting ends of respective ones of said pair of pinion pins, and planet pinions carried by each of said pair of pinion pins.

9. A differential gear as claimed in claim 1, wherein said annular member is positioned to contact only ends of said pin and said cage.

* * * * *